United States Patent [19]

Blase

[11] Patent Number: 4,813,224

[45] Date of Patent: Mar. 21, 1989

[54] ENERGY SUPPLY CHAIN

[76] Inventor: Günther C. Blase, Oberkülheim 10, D-5060 Bergisch Gladbach 1, Fed. Rep. of Germany

[21] Appl. No.: 902,053

[22] Filed: Aug. 26, 1986

[30] Foreign Application Priority Data

Aug. 30, 1985 [DE] Fed. Rep. of Germany ....... 3531066

[51] Int. Cl.⁴ .............................................. F16G 13/16
[52] U.S. Cl. ...................................... 59/78.1; 59/900; 248/49; 248/51; 474/206
[58] Field of Search .................... 59/78.1, 900; 248/49, 248/51, 52, 78; 474/206

[56] References Cited

U.S. PATENT DOCUMENTS

| | | | |
|---|---|---|---|
| 4,104,871 | 8/1978 | Moritz | 59/78.1 |
| 4,590,961 | 5/1986 | Schumann | 59/78.1 |
| 4,625,507 | 12/1986 | Moritz et al. | 59/78.1 |
| 4,626,233 | 12/1986 | Moritz | 59/78.1 |

FOREIGN PATENT DOCUMENTS 3408912  8/1985  Fed. Rep. of Germany ....... 59/78.1

*Primary Examiner*—David Jones
*Attorney, Agent, or Firm*—Browdy and Neimark

[57] ABSTRACT

In an energy supply chain for receiving cables, hoses and the like, the chain links are made box-shaped and are provided alternately with studs and circular orifices on their side walls, and consist entirely of plastic material, without the use of additional connecting elements. Each chain link consists of a pair of mirror-inverted side plates and of a pair of identically equal crosspieces, all of which made of plastic material. In a modified embodiment only the side plates of every second chain link are connected to one another by means of crosspieces, while the side pieces of the intervening chain links carry fork-shaped projections for receiving a flexible band. The afore-said two bands extending on both sides of the energy supply chain and over the entire length of the same, cover the interior against dirt or water splashes penetrating from outside.

6 Claims, 6 Drawing Sheets

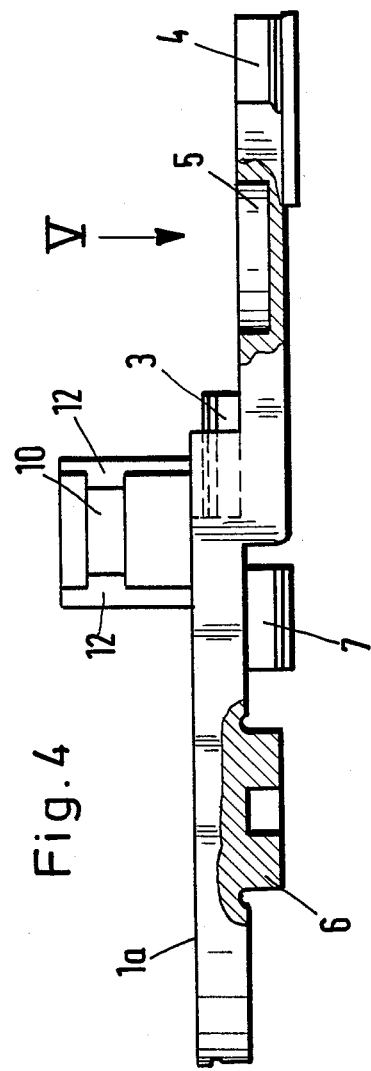
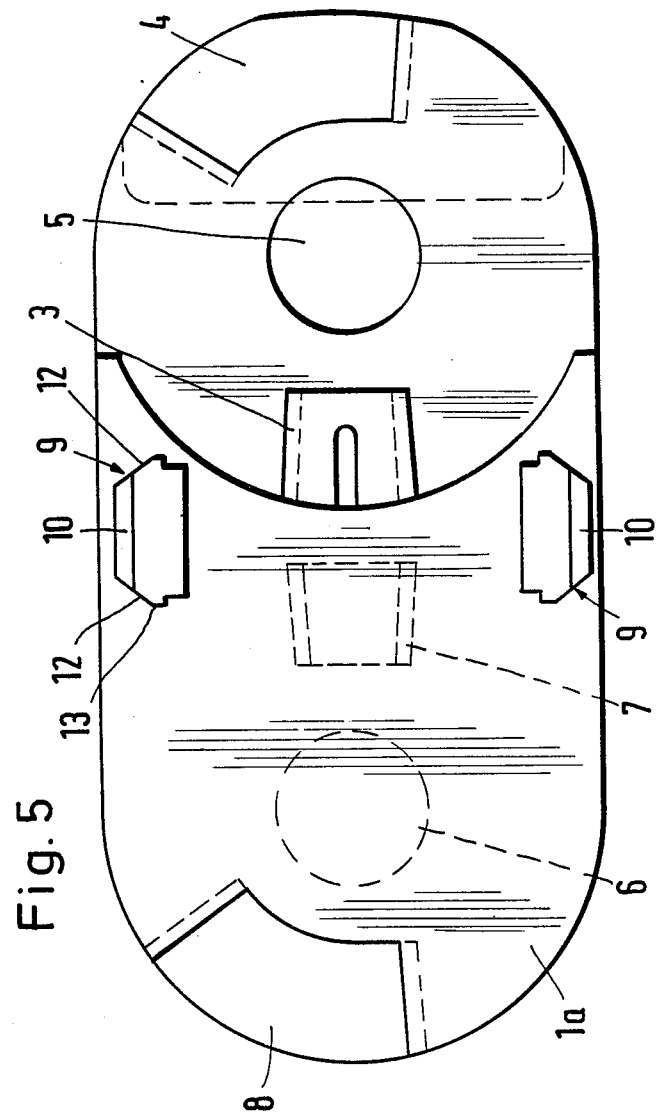

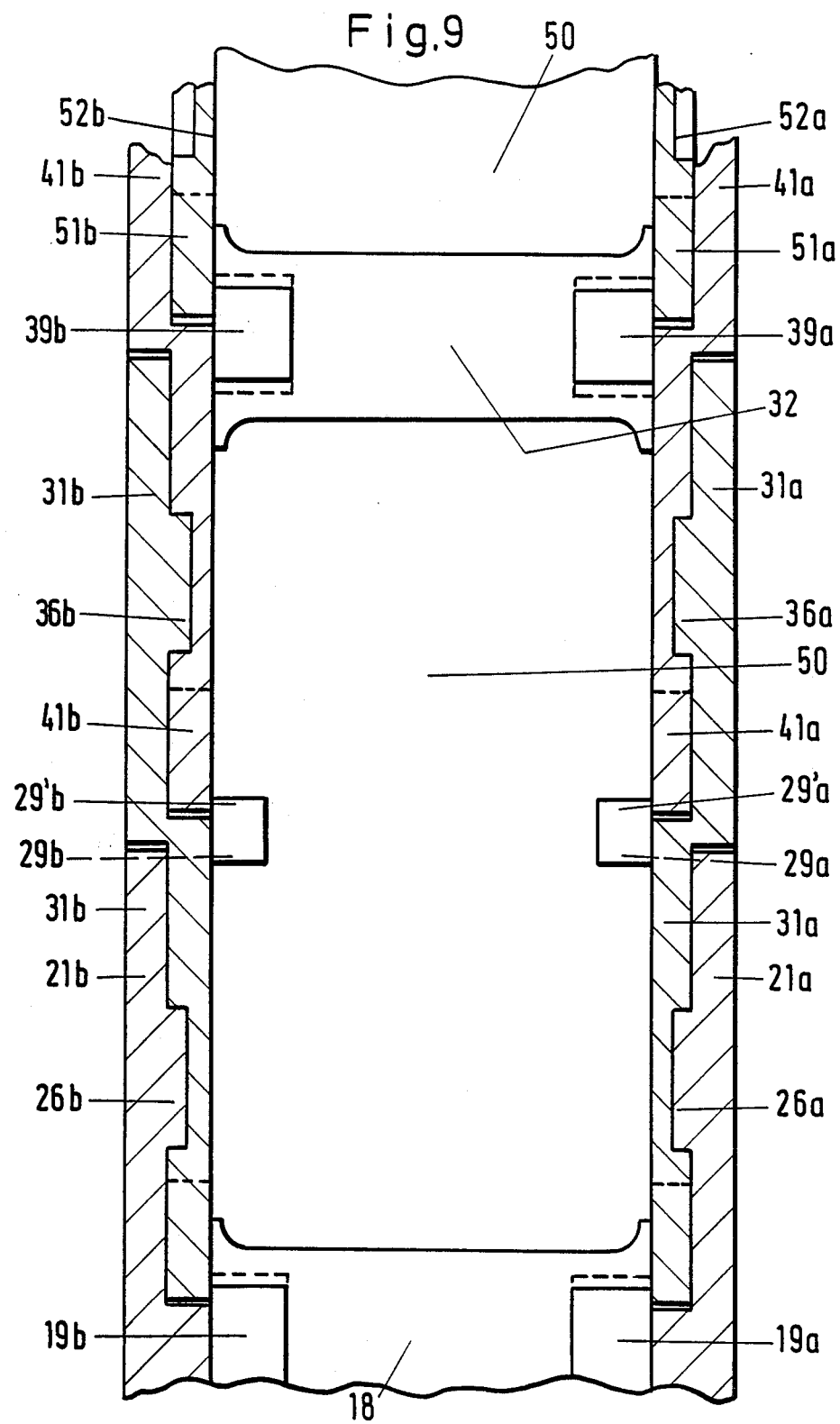

ENERGY SUPPLY CHAIN

The invention relates to an energy supply chain for receiving cables, hoses and the like, the chain links of which are made box-shaped and are provided alternately with studs and circular orifices on their side walls, the studs of one chain link engaging into the orifices of the following chain link, and the pivotability of successive chain links being limited by stops in the side walls of successive chain links.

The disadvantage of this known energy supply chain is that the injection mould for producing the chain links is very expensive because of the relatively complicated shape. Furthermore, a large storage space is required for stocking the bulky chain links.

Finally, energy supply chains of different widths also require chain links of correspondingly different widths. This increases the number of injection moulds and consequently the production cost as well as the storage space.

The object on which the invention is based is to provide an energy supply chain of the type mentioned in the introduction, which does not have the disadvantages mentioned above.

To achieve this object, it is proposed that the chain links be composed of four individual plastic parts, without the use of additional connecting elements, in particular of two mirror-inverted side plates made of plastic the halves of which are bent respectively inwards and outwards relative to one another, and two identically equal crosspieces which, at their ends, are provided with engagement grooves, into which engagement projections protruding from the side plates engage when the chain link is assembled.

The side plates designed according to the invention are much less complicated to produce and do not require such complicated and therefore expensive injection moulds as closed one-piece chain links.

The upper and lower crosspieces are identically equal, so that only a single injection mould is needed for them. Chain links of different widths, but with otherwise the same dimensions of the side plates, can now be assembled in a simple way by the use of crosspieces of different lengths.

However, these crosspieces can also to a certain extent be used for side plates of different dimensions and their design be adapted to these.

In general, the space required for storage is considerably reduced as a result, and, according to the requirements of the particular customer, different chain links can be assembled from the sideplates and crosspieces kept in stock.

According to the customer's wishes, right-hand and left-hand side plates and crosspieces in the desired dimensions can then also be delivered separately to him, and the chain links are only assembled by the customer himself. The dispatch volume is thereby reduced considerably.

However, it is of course also possible, as before, to deliver finished chain links or even complete energy supply chains.

A particularly important feature, here, is that a chain link can be assembled from the two mirror-inverted side plates and the crosspieces, without the use of additional connecting elements, such as screws, bolts, nuts and the like. This reduces the price of the chain links, and in addition, as will be seen in detail below, the time and therefore the cost of assembling the chain links are also reduced as a result. Furthermore, this also prevents loosening of the connections, such as otherwise occurs frequently where plastic/metal connections are concerned and which can only be prevented by means of measures involving a relatively high outlay.

Finally, the chain links of the energy supply chain according to the invention consist only of plastic, so that any danger of corrosion, as is always present in energy supply chains with metal components, is reliably prevented here.

In conclusion, a particularly beneficial effect is obtained because no tools are required for assembling the four individual plastic parts into a chain link.

Preferably, the crosspieces of C-shaped crosssection have longitudinally extending reinforcing ribs which are each recessed at the ends of the crosspieces. At the same time, the engagement grooves start laterally from these recesses. Bar-shaped engagement bars protrude inwards from the side plates and penetrate into the abovementioned recesses at the ends of the crosspieces.

Furthermore, engagement webs protrude from the lateral run-on surfaces of the engagement bars and engage into the engagement grooves starting laterally from the recesses.

Moreover, noses protrude from the engagement bars on sides facing away from one another, and perforations are provided in the ends of the crosspieces in the region of the recesses and receive the said noses.

Additionally, the stops for limiting the pivoting of successive chain links have sector-like clearances on the periphery of the approximately circularly rounded ends of the side plates and possess projections assigned to these and located near the centre of the side plates.

Finally, one projection protrudes from the outside of the inwardly bent half of the side plate, whilst the other projection protrudes from the inside of the outwardly bent half of the side plate.

The invention further relates to an energy supply chain for receiving cables, hoses and the like, of which the chain links consisting of plastic are formed by side plates which are arranged at a distance from one another and which are provided alternately with studs and circular orifices, the studs of the side walls of one chain link engaging into the orifices of the following chain link and the mutual pivotability of successive chain links being limited by stops in the adjacent side plates, the side plates consisting of mutually bent halves which succeed one another in the chain direction and which are respectively bent inwards and outwards relative to one another, and the mutually opposing side plates of every second chain link being connected to one another by means of crosspieces which, at their ends, are provided with engagement grooves, into which engagement projections protruding from the side plates engage when the chain link is assembled, whilst the side walls of the intervening chain links carry, on each of their longitudinal edges, fork-shaped projections, the slot-shaped orifices of which extend parallel to these longitudinal edges, the slot-shaped orifices of the mutually opposing side plates facing one another and being aligned with one another, and there being inserted, on each longitudinal side of the energy supply chain, into the said slot-shaped orifices a flexible band which extends, transversely relative to to the longitudinal direction of the energy supply chain, between the mutually opposing side plates forming the chain links and over the entire length of the energy supply chain, the energy supply chain being closed on both sides by means of the said bands over its entire length.

Such an energy supply chain is thus covered over and beyond its entire length by the said flexible band on its two sides, between the edges of the opposing side plates, so that dirt and also water splashes are substantially prevented from penetrating.

Furthermore, at the same time, the said crosspieces are of C-shaped cross-section and have longitudinally extending reinforcing ribs which are each recessed at the ends of the crosspieces, the engagement grooves starting laterally from these recesses and bar-shaped engagement bars protrude inwards from the side plates and penetrate into the recesses at the ends of the crosspieces.

Again in this design of the energy supply chain, bar-shaped engagement bars protrude inwards from the side plates connected to one another in pairs by means of crosspieces and penetrate into the recesses at the ends of the crosspieces, and engagement webs protrude from the lateral run-on surfaces of the engagement bars and engage into the engagement grooves starting laterally from the recesses.

Moreover, bar-shaped engagement bars protrude inwards from the side plates connected to one another in pairs by means of crosspieces and penetrate into the recesses at the ends of the crosspieces, noses protrude from the engagement bars on sides facing away from one another, and perforations are provided in the ends of the crosspieces in the region of the recesses and receive the said noses.

Again in this design of the energy supply chain, the stops for limiting the pivoting of successive chain links are formed by sector-like clearances on the periphery of the approximately circularly rounded ends of the side plates and by projections assigned to these and located near the centre of the side plates.

Furthermore, at the same time, one of the said projections protrudes from the outside of the inwardly bent half of the side plate, whilst the other projection protrudes from the inside of the outwardly bent half of the side plate.

The invention is explained in detail below in an exemplary embodiment with reference to the drawing. In the latter:

FIG. 4 shows a view of a side plate in the direction of the arrow IV in FIG. 1;

FIG. 5 shows a view of the side plate illustrated in FIG. 4, in the direction of the arrow V in the latter Figure;

FIG. 9 shows a section along the line IX—IX in FIG. 6.

Figure 1:
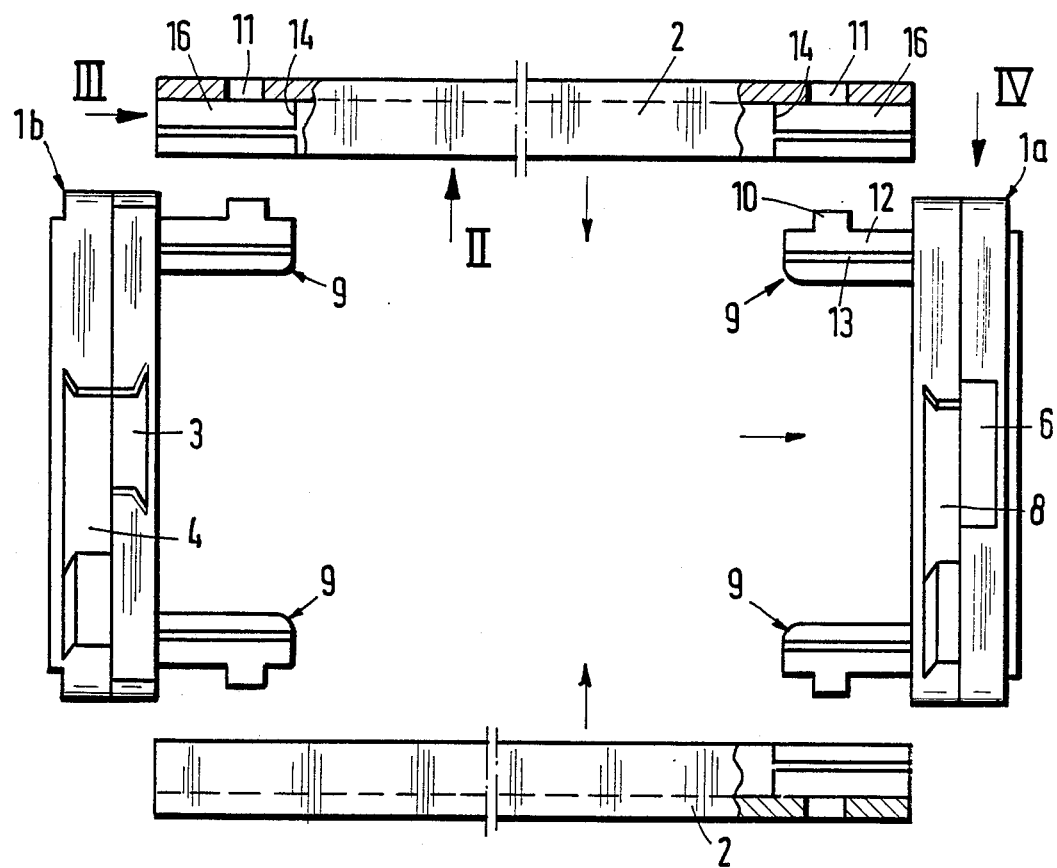
FIG. 1 shows a plan view of the four parts forming a chain link, shortly before they are assembled.
Figure 2:
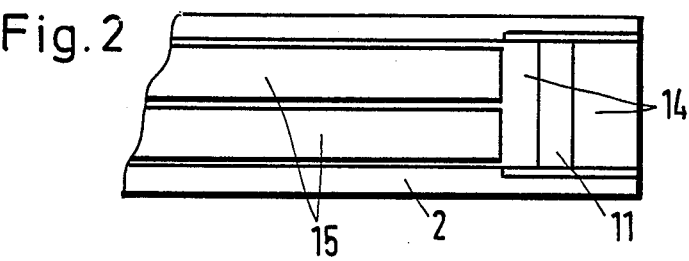
FIG. 2 shows a view of a crosspiece in the direction of the arrow II in FIG. 1.

Before the design of the side plates and of the crosspieces is discussed in detail with reference to FIGS. 1 to 5, it should be noted that an energy supply chain is formed from the individual chain links by the engagement of the studs 6 protruding on the outer faces of the side plates into the respective circular depressions 5 located on the inner faces of the next chain link. It thereby becomes possible for successive chain links to pivot.

The rounding on one end (on the left in FIG. 5) of the side plate 1a corresponds to a circular clearance on the inner side at the other end of the side plate. When such chain links are assembled to form an energy supply chain, the rounded end of one chain link penetrates into the circular clearance at the other end of the next chain link and is likewise guided pivotably in it. The circular rounding and the circular clearance located at the other end are arranged concentrically relative to the circular depression 5 and to the circular-cylindrical stud 6.

As can be seen in FIGS. 4 and 5, an approximately trapezoidal stop 3 projects into the circular clearance at the right-hand end of the side plate 1a. A sector-like clearance 8 on the outer side of the side plate 1a at its other end corresponds to this stop. By means of this stop 3 engaging into the clearance 8, the pivoting of two successive chain links is limited on both sides.

Finally, located on the outside of the side plate 1 its left-hand part is a likewise slightly trapezoidal projection 7, to which a clearance 4 at the other end of the side plate corresponds. In an assembled energy supply chain, this stop 7 is located within the sector-like clearance 4 and likewise limits the pivoting of successive chain links.

Consequently, the above mentioned stops 3 and 7 and the sector-like clearances 8 and 4 receiving these stops ensure that the pivoting of successive chain links is limited in one end position and in the other, and relatively high torques can be absorbed by these stops.

As can be seen in FIGS. 4 and 5 and particularly also in FIG. 1, engagement bars 9, the shape and mode of action of which are explained in detail below, protrude from a side plate respectively near the upper and lower straight longitudinal sides of the latter.

The cross-section of these engagement bars emerges from FIG. 5. Each engagement bar is limited on both sides by two run-on surfaces 12 which are arranged obliquely relative to one another and which, as explained below, are intended to allow the crosspieces to engage easily.

The crosspieces 2, of which the rectangular crosssection filled almost completely in the middle part is pierced by three indentations extending in the longitudinal direction, have specially designed recesses at their ends. In particular, the two longitudinally extending ribs 15 of each crosspiece 2, which are formed by the abovementioned indentations, have been removed within the recesses 14, specifically over a length equal to the length of the engagement bars 9 protruding from the side plate. These crosspieces can therefore be moved towards the engagement bars 9 of the side plates as a result of a movement in the direction of the unmarked vertical arrows in FIG. 1. The engagement bars 9 then engage into the recesses 14, and the crosspiece walls limiting the recesses 14 laterally are somewhat sprung apart from another.

Figure 3:
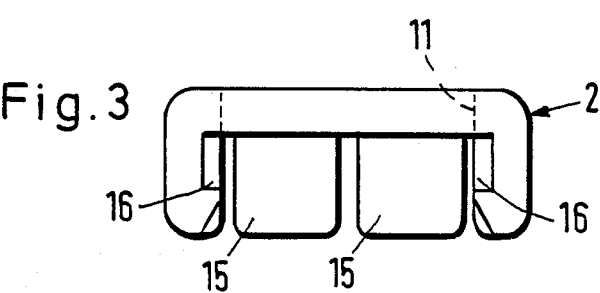
FIG. 3 shows a view of the end face of a crosspiece in the direction of the arrow III in FIG. 1.

As shown in FIG. 3, engagement grooves 16 extending over the entire length of the recesses 14 are arranged in the abovementioned walls. The engagement webs 13 at the end of the oblique run-on surfaces 12 of each engagement bar 9 finally engage into these engagement grooves 16 and prevent the assembly from subsequently falling apart. In order also to prevent the side plates 1a and 1b together with their engagement bars 9 from being pushed off out of the recesses 14 and the engagement grooves 16, the engagement bars 9 are equipped with noses 10 on their outer faces, as shown particularly in FIG. 5.

In a corresponding way, the recesses 14 or the continuous crosspiece wall limiting them are pierced with a respective transverse rectangular perforation 11, the dimension and arrangement of which are such that, when the engagement bar 9 snaps into the recess 14, the nose 10 at the same time springs into the perforation 11. This prevents the crosspiece and the engagement bar arranged in its end from being pulled apart from one another.

Consequently, the crosspieces 2 are connected captively to the two side plates 1a and 1b in a simple way as a result of snapping in. No special tool is required for this assembly operation, nor are any special connecting elements needed.

In the modified embodiment of the energy supply chain illustrated in FIGS. 6 to 9 and described below, this does not consist of identical chain links, as in the design according to FIGS. 1 to 5, but two different types of chain links are used alternately here for the reasons to be explained below.

In some uses, it is desirable to prevent dirt or water splashes from being capable of penetrating easily from outside into the interior of the energy supply chain. For this purpose, the interspaces between successive crosspieces would have to be closed as effectively as possible. To achieve this additional object, a modified chain link is inserted between every two chain links of the type described in the introduction and illustrated in FIGS. 1 to 5 and makes it possible to fasten a continuous flexible band for covering the energy supply chain. This intermediate link makes do without crosspieces holding the two side plates together, and instead there are fork-shaped projections 21a, 21b, 29a', 29b', the design and arrangement of which can be seen in FIGS. 6 and 7. As can also be ascertained in these Figures, a flexible band 50 is inserted between the parts of each fork-shaped projection, specifically on the two mutually opposing side plates 21a and 21b, and extends from side plate to side plate. These two flexible bands 50 reach over the entire length of the energy supply chain and cover the latter between the crosspieces 18, 32. As can be seen further in FIG. 6, the two flexible bands 50 are guided respectively in the chain link 17a, 17b and in the chain link side plates 31a, 31b outside the crosspieces 18 and 32.

The flexibility of the bands 50 allows the chain links of the energy supply chain to pivot within certain limits. The flexible bands can consist of various materials, but are preferably produced from plastic sheeting.

Figure 6:
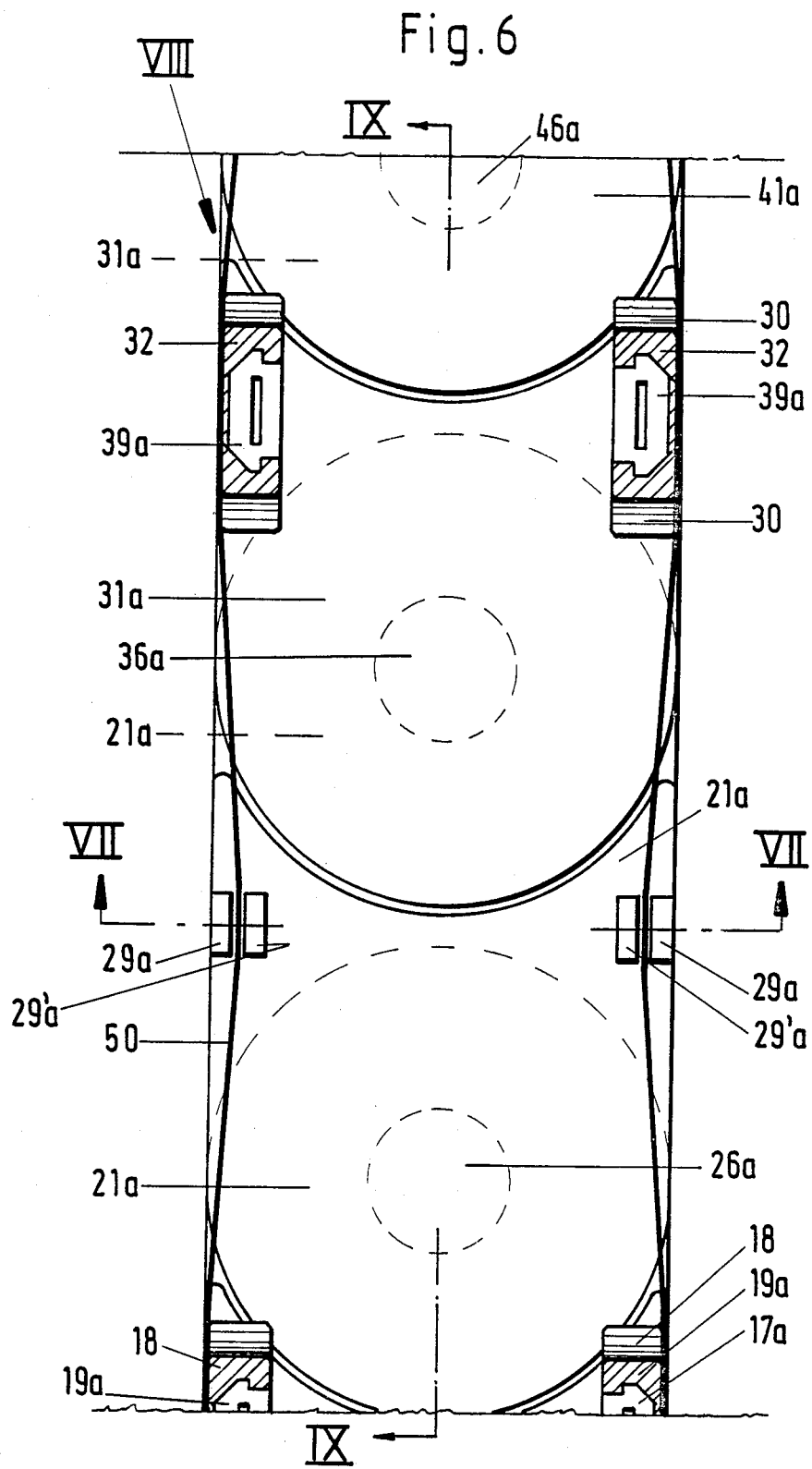
FIG. 6 shows a plan view of three side plates assembled into an energy supply chain, in a modified embodiment.

The successive chain link side plates 17a, 21a, 31a and 41a shown in FIGS. 6 and 9 are respectively equipped, in the way already described with regard to the design according to FIGS. 1 to 5, with studs 26a, 26b, 36a, 36b, 46a, 46b engaging into corresponding orifices or recesses, of which FIG. 9 shows only the recesses 52a and 52b in the side walls 51a and 51b. Here again, corresponding stops are provided in the side walls for limiting the pivotability of successive chain links, but are not represented for the sake of simplicity.

In the same way as described with reference to the design of FIGS. 1 to 5, engagement bars 19a, 19b and 39a, 39b, onto which crosspieces 18 and 32 are attached, protrude from the chain link side plates 17a, 31a, 31b illustrated in FIGS. 6 and 9.

Figure 7:
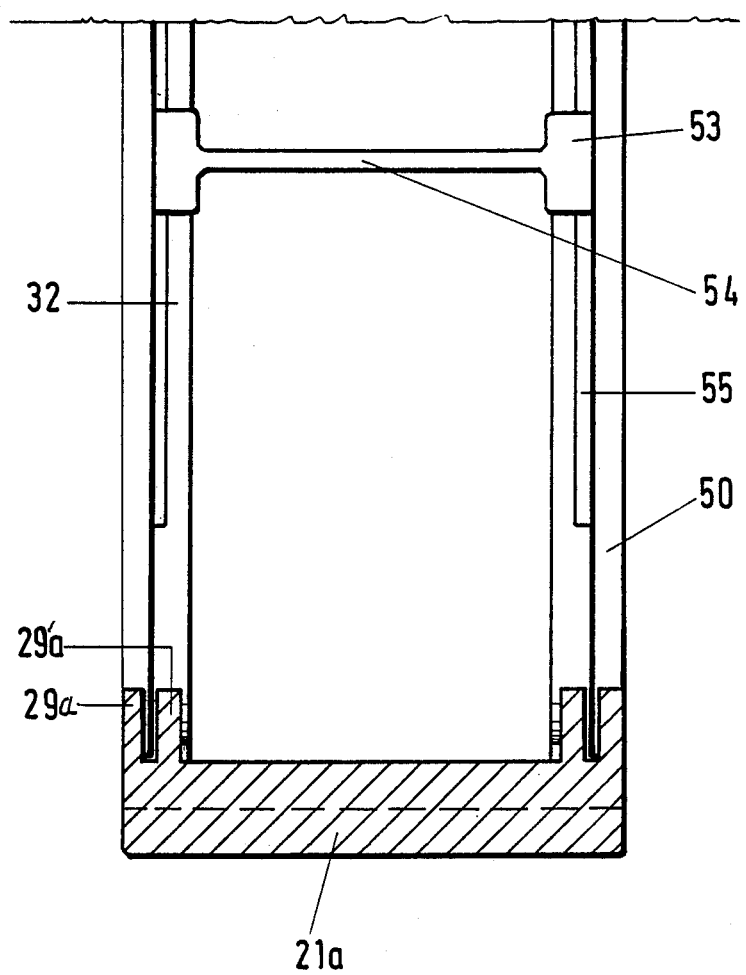
FIG. 7 shows a section along the line VII—VII in FIG. 6.
Figure 8:
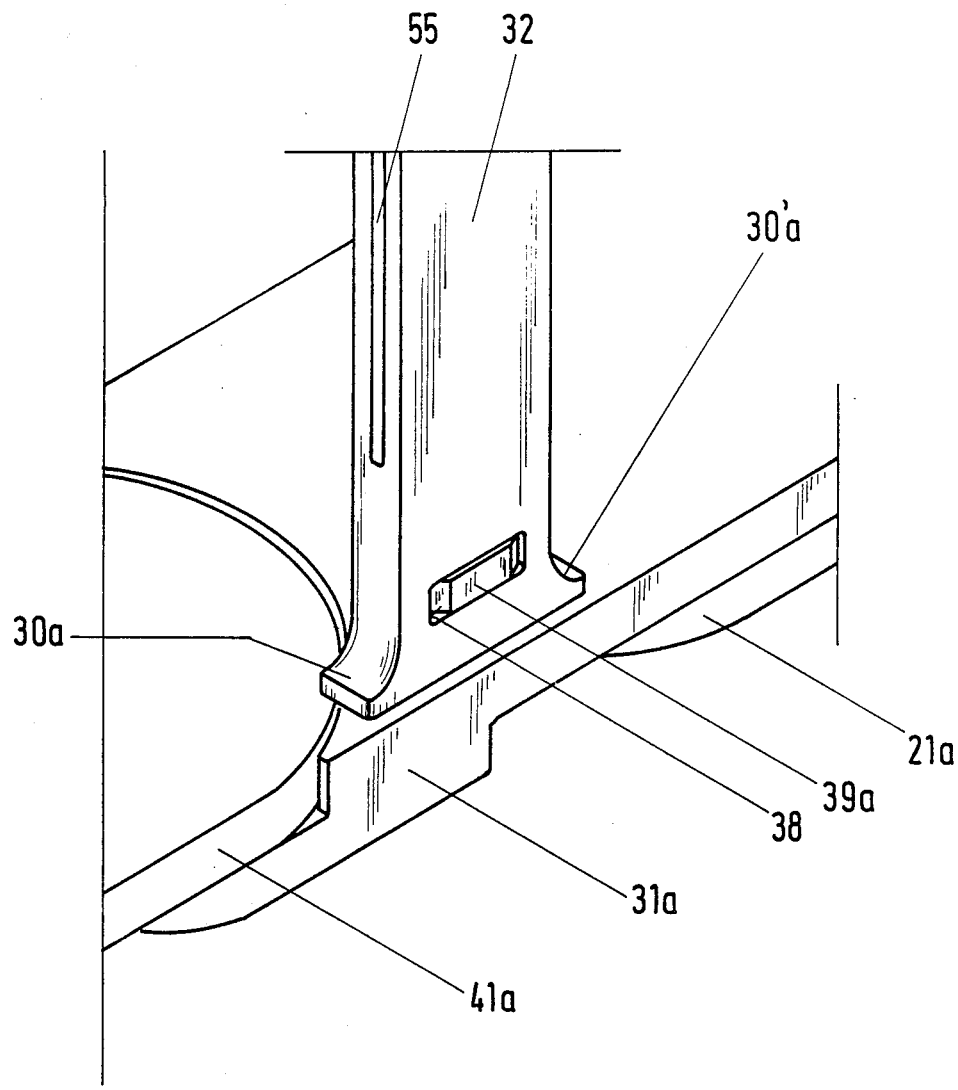
FIG. 8 shows a perspective part-representation, as seen in the direction of the arrow VIII in FIG. 6.

FIGS. 7 and 8 show such crosspieces 32 which here are provided with slots 55 in their longitudinal direction. These slots extend over most of the length of the crosspieces and, as can be seen in FIG. 7, serve for receiving spacer pieces 54. These spacer pieces serve to subdivide the interior, if it is intended to introduce two different groups of cables or the like. Moreover, these spacer pieces 54 also further reinforce the individual chain links.

As can also be seen in FIG. 8, the ends of the crosspieces 32 are widened at 30, specifically to such an extent that they cover the rounded end of the next side plate 41a on one side of the crosspiece 32. In particular (not indicated), like the side plate 21a or 21b, this side plate does not possess a crosspiece connecting the opposing side plates to one another. On the contrary, only these fork-shaped projections for receiving the flexible band are provided there. So that the side plates of this chain link cannot fall out, they are held at their ends by means of the widened portions of the crosspieces. These side plates 21a and 21b or 41a and 41b are further retained by means of the studs and recesses, via which they are connected pivotably to the adjacent side plates.

I claim:

1. An energy supply chain for receiving cables, tubes, and the like comprising
   chain links of box-shaped design including
      symmetrical side plates having alternately located pins and circular openings with said pin of one said chain link engaged into said circular opening of a following said chain link allowing a mutual swivelling capability of successive said chain links,
      stops on said side plates of successive ones of said chain links limiting the mutual swivelling capability of said successive said chain links,
      symmetrical connecting elements between transversally located side plates of the chain;
      said connecting elements each including
      two identical crossbars having notch grooves at each of their ends,
      catch protrusions projecting from said side plates engagable with said crossbars during assembly of the chain;
   said catch protrusions being bar-shaped engagement bars protruding inward from said side plates and having engagement webs protruding from lateral run-on surfaces;
   said engagement webs engaging said crossbars in said notch grooves;
   said engagement bars having noses protruding from said engagement bars on sides of said engagement bars facing away from one another;
   said crossbars having perforations in the ends of said crossbars, in the region of said notch grooves, located to receive said noses.

2. An energy supply chain for receiving cables, tubes, and the like comprising
   chain links of plastic-like material including
      symmetrical side plates spaced from each other and having alternately located pins and circular openings with said pin of one said chain link engaged into said circular opening of a following said chain link allowing a mutual swivelling capability of successive said chain links, stops on said side plates of successive ones of said chain links limiting the mutual swivelling capability of said successive said chain links, symmetrical connecting elements between mutually opposing side plates of each second one of said chain links;

said connecting elements each including crossbars having notch grooves at each of their ends, catch protrusions projecting from said side plates into said notch grooves, engagable with said crossbars during assembly of said chain links, said catch protrusions being bar-shaped engagement bars protruding inward in pairs from said side plates, said engagement bars engaging said crossbars in said notch grooves, said engagement bars having noses protruding from said engagement bars on sides of said engagement bars facing away from said crossbars, in the region of said notch grooves, located to receive said noses;

intervening ones of said side plates between those of said side plates attached by said connecting elements, on their longitudinal edges, having fork-shaped projections with slot-shaped orifices extending parallel to said longitudinal edges and facing each other and substantially aligned with each other from said mutually opposing side plates;

a flexible band extending relative to the longitudinal length of the energy supply chain closing both sides of said chain links along substantially the length of the chain;

said flexible band inserted in said slot-shaped orifices of said fork-shaped orifices and over a said crossbar.

3. The energy supply chain of claim 2 wherein
said crossbars have C-shaped cross-sections having longitudinally extending reinforcing ribs extending to said notch grooves; and
said catch protrusions penetrate into said notch grooves.

4. The energy supply chain of claim 2 wherein
said catch protrusions are bar-shaped engagement bars having engagement webs protruding from lateral run-on surfaces;
said engagement webs engaging said crossbars by penetrating into said notch grooves.

5. The energy supply chain of claim 2 wherein
said stops on said side plates include
sector-like clearances on the periphery of substantially circularly rounded ends of said side plates,
and stop projections for extension into said sector-like clearances, said stop projections located substantially near the center of said side plates.

6. The energy supply chain of claim 5 wherein
said side plates have substantially two halves extending in two parallel planes and connected in the middle of said side plate;
each of said side plate halves having a said stop projection extending therefrom from opposite sides of said side plate.

* * * * *

UNITED STATES PATENT AND TRADEMARK OFFICE
CERTIFICATE OF CORRECTION

PATENT NO. : 4,813,224
DATED : March 21, 1989
INVENTOR(S) : Gunther C. BLASE

It is certified that error appears in the above-identified patent and that said Letters Patent is hereby corrected as shown below:

Column 2, line 46   After "link", insert a comma -- , --

Column 5, line 39   Delete "21a, 21b, 29a', 29b' and insert therefor -- 29a, 29b, 29'a, 29'b --

Column 7, line 21   After "from", insert -- one another; said crossbars having perforations in the ends of --

Signed and Sealed this

Twenty-first Day of May, 1991

Attest:

HARRY F. MANBECK, JR.

*Attesting Officer*    *Commissioner of Patents and Trademarks*